(12) United States Patent
Singh et al.

(10) Patent No.: US 8,326,513 B2
(45) Date of Patent: Dec. 4, 2012

(54) GAS TURBINE COMBUSTION DYNAMICS CONTROL SYSTEM AND METHOD

(75) Inventors: Kapil Kumar Singh, Niskayuna, NY (US); Fei Han, Niskayuna, NY (US); Shiva Srinivasan, Greenville, SC (US); Kwanwoo Kim, Greenville, SC (US); Preetham Balasubramanyam, Niskyuna, NY (US); Nan Zong, Greenville, SC (US); Qingguo Zhang, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 656 days.

(21) Appl. No.: 12/539,763

(22) Filed: Aug. 12, 2009

(65) Prior Publication Data
US 2011/0040469 A1 Feb. 17, 2011

(51) Int. Cl.
*G06F 19/00* (2011.01)
(52) U.S. Cl. ............................ 701/100; 701/103; 60/773
(58) Field of Classification Search .................. 701/100, 701/103, 104, 105, 112; 477/30; 60/39.27, 60/773
See application file for complete search history.

(56) References Cited

U.S. PATENT DOCUMENTS

| | | | |
|---|---|---|---|
| 6,522,991 B2 | 2/2003 | Banaszuk et al. | |
| 6,640,549 B1 | 11/2003 | Wilson et al. | |
| 2006/0042261 A1* | 3/2006 | Taware et al. | 60/773 |
| 2006/0123792 A1 | 6/2006 | Xu et al. | |
| 2008/0010966 A1* | 1/2008 | Taware et al. | 60/39.27 |
| 2008/0134684 A1 | 6/2008 | Umeh et al. | |

OTHER PUBLICATIONS

F.E.C. Culick; "Vortex Shedding and Passive Control of Combustion Instabilities ";Dynamics of Combustion Systems: Fundamentals, Acoustics, and Control a Short Course of Lectures; California Institute of Technology Sep. 2001; 36Pages.

* cited by examiner

*Primary Examiner* — Gertrude Arthur Jeanglaude
(74) *Attorney, Agent, or Firm* — Ann M. Agosti

(57) ABSTRACT

A gas turbine engine control system comprises a data acquisition and analysis system for receiving a signal from a combustion dynamics sensor and providing an output signal and a combustion dynamics control system for controlling combustion dynamics based on the output signal. The control system is associated with a purge-air flow and comprises an acoustic driver, or a flow-manipulating device, or both to perturb the purge-air flow entering the combustor can for controlling combustion dynamics.

26 Claims, 6 Drawing Sheets

GAS TURBINE COMBUSTION DYNAMICS CONTROL SYSTEM AND METHOD

BACKGROUND

The invention relates generally to methods for controlling the operation of gas turbine engines and, more particularly, to a method of controlling combustion dynamics in gas turbines.

Gas turbines engines include a compressor, a combustor, and a turbine coupled to the compressor. The combustor can include a plurality of combustor cans. Compressed air and fuel are delivered to the combustor cans to produce high-velocity and high-pressure combustion gases. These combustion gases are discharged to the turbine. The turbine extracts energy from the combustion gases for producing power that can be used in several ways such as, for example, to power the compressor, to power an electrical generator, or to power an aircraft.

Gas turbine engines operate under different load conditions that necessitate varying combustion operating conditions for the combustors to meet desired performance. Under some conditions, combustion phenomenon can interact with natural modes of combustors, establishing a feedback cycle. This leads to high-amplitude pressure fluctuations or perturbations. These pressure perturbations are referred to as combustion dynamics. Combustion dynamics are capable of restricting the operating conditions of the gas turbine and can also cause hardware damage or unscheduled shutdown.

Combustion dynamics is an issue faced by all types of combustors. Due to the design, combustion dynamics are relatively more severe for modern pre-mixed combustion systems that were developed in order to achieve reduced emissions. It would therefore be desirable to provide a method for controlling combustion dynamics in gas turbine engines.

BRIEF DESCRIPTION

In accordance with one embodiment disclosed herein, a gas turbine engine control system comprises a data acquisition and analysis system for receiving a signal from a combustion dynamics sensor and providing an output signal and a combustion dynamics control system for controlling combustion dynamics based on the output signal. The control system is associated with a purge-air flow and comprises an acoustic driver, or a flow-manipulating device, or both to perturb the purge-air flow entering the combustor can for controlling combustion dynamics.

In accordance with another embodiment disclosed herein, a gas turbine engine control method comprises receiving a signal from a combustion dynamics sensor and controlling combustion dynamics based on the received signal by perturbing a purge-air flow entering a combustor can using acoustic signals, flow-manipulation, or a combination thereof.

In accordance with another embodiment disclosed herein, a system for a gas turbine engine comprises a data acquisition and analysis system for receiving a signal from a combustion dynamics sensor and providing an output signal and a combustion dynamics control system for controlling combustion dynamics based on the output signal. The control system comprises a controller and at least one of an acoustic driver, a flow-manipulating device, and a dedicated flow path for delivering a flow into a combustor can to perturb a purge-air flow entering the combustor can, perturb a vortex phenomenon in the combustor can, or both for controlling combustion dynamics.

In accordance with another embodiment disclosed herein, a gas turbine engine control method comprises receiving a signal from a combustion dynamics sensor and controlling combustion dynamics based on the received signal by perturbing a purge-air flow entering a combustor can, a vortex phenomenon in the combustor can, or both using acoustic signals, flow-manipulation, a dedicated flow into a combustor can, or a combination thereof.

DRAWINGS

These and other features, aspects, and advantages of the present invention will become better understood when the following detailed description is read with reference to the accompanying drawings in which like characters represent like parts throughout the drawings, wherein:

FIG. 1 is a schematic of a gas turbine engine system.

FIG. 2 a schematic of a gas turbine combustor.

DETAILED DESCRIPTION

Embodiments disclosed herein include a system and method for controlling combustion dynamics in gas turbine engines. The system and method control combustion dynamics in a combustor can by perturbing a purge-air flow entering the combustor can, a vortex phenomenon in the combustor can, or both. Acoustic signals, flow manipulation, dedicated flow path, or a combination thereof are used to perturb purge-air flow and vortex phenomenon. Although the system and method are described herein in the context of a heavy duty gas turbine engine employed for industrial application, the system and method are applicable to other combustion engine systems utilized in various applications such as, but not limited to, aircraft, marine, helicopter, and prime-mover applications. As used herein, singular forms such as "a," "an," and "the" include plural referents unless the context clearly dictates otherwise.

Figure 1:
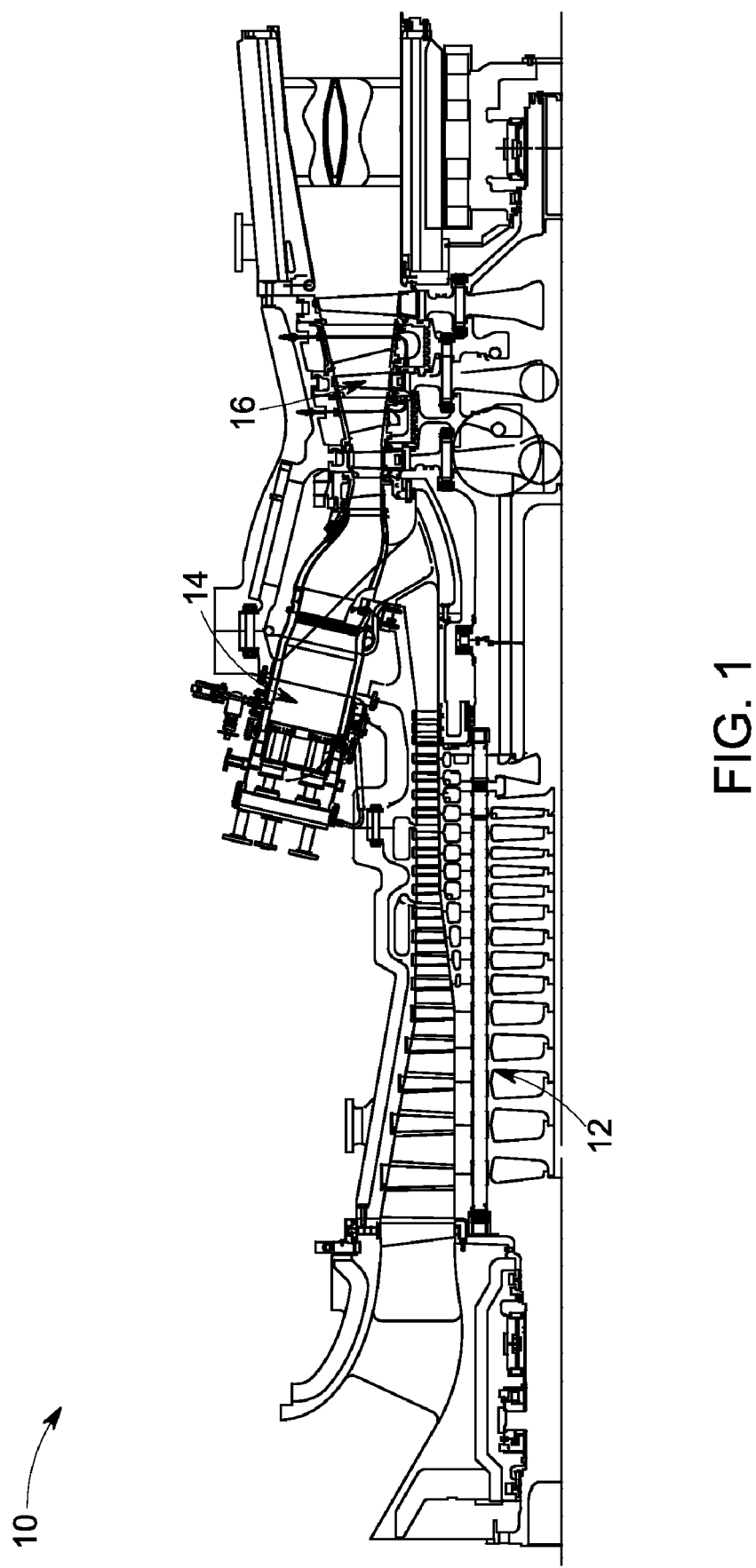

FIG. 1 illustrates an exemplary gas turbine engine 10. The gas turbine engine 10 includes a multi-stage axial compressor 12, a multi-can combustor 14, and a multi-stage turbine 16. Ambient air is drawn in by the compressor 12 and compressed to higher pressure and temperature. The compressed air is then supplied to the combustor 14. In the combustor 14, the incoming compressed air is mixed with fuel and the fuel-air mixture is combusted to produce high-pressure and high-temperature combustion gases. These combustion gases are discharged to the turbine 16. The turbine 16 extracts energy from the combustion gases. The energy extracted from the turbine 16 can be for various purposes such as generating electrical power, providing propulsive thrust, or providing shaft power for marine or prime mover applications.

Figure 2:
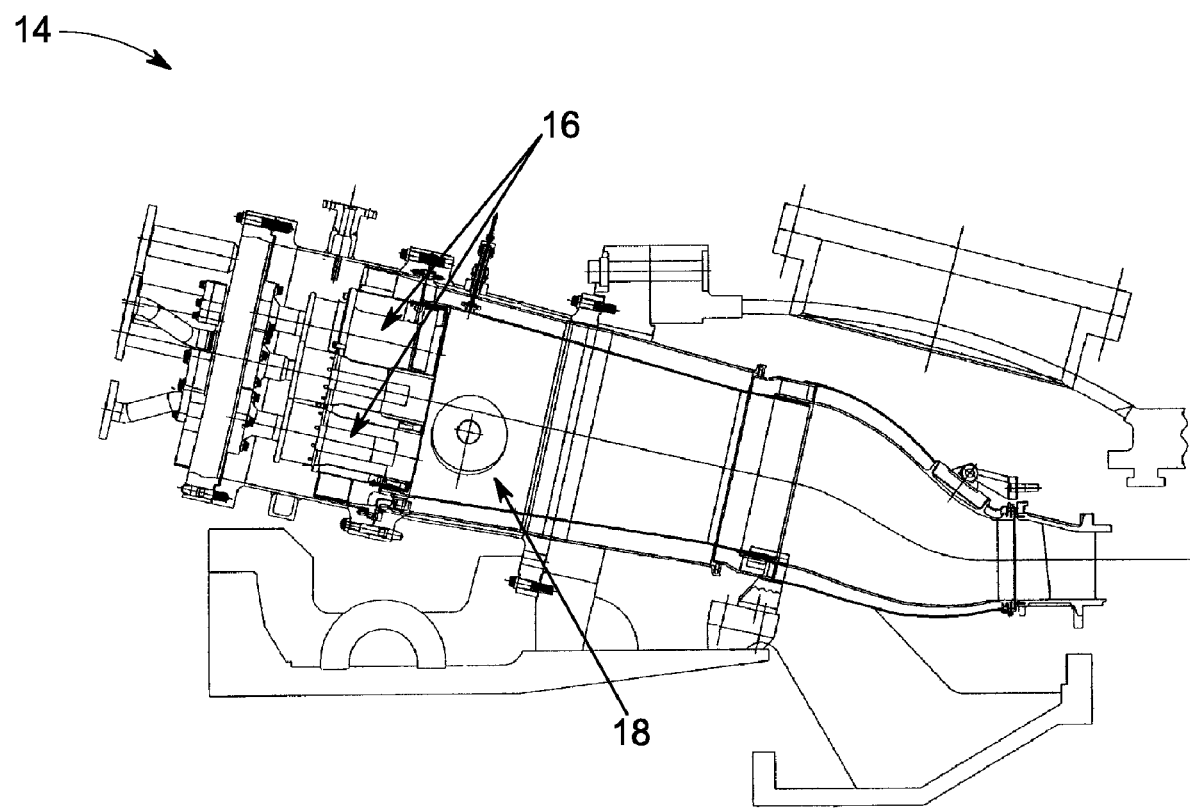

FIG. 2 is a schematic of a gas turbine combustor 14. The combustor 14 may be of annular, can, or can-annular type combustor. The combustor 14 can have different types of nozzles 16 depending on intended application. Modern low-emission combustors typically employ a pre-mixer nozzle in which fuel is injected in an air stream and mixed before reaching a combustion chamber 18. A typical combustor 14 will have multiple pre-mixer nozzle groups and different number of nozzles in each group. This is required to achieve performance objectives under various load conditions. The classification of various nozzle groups depends on their intended purpose.

Figure 3:
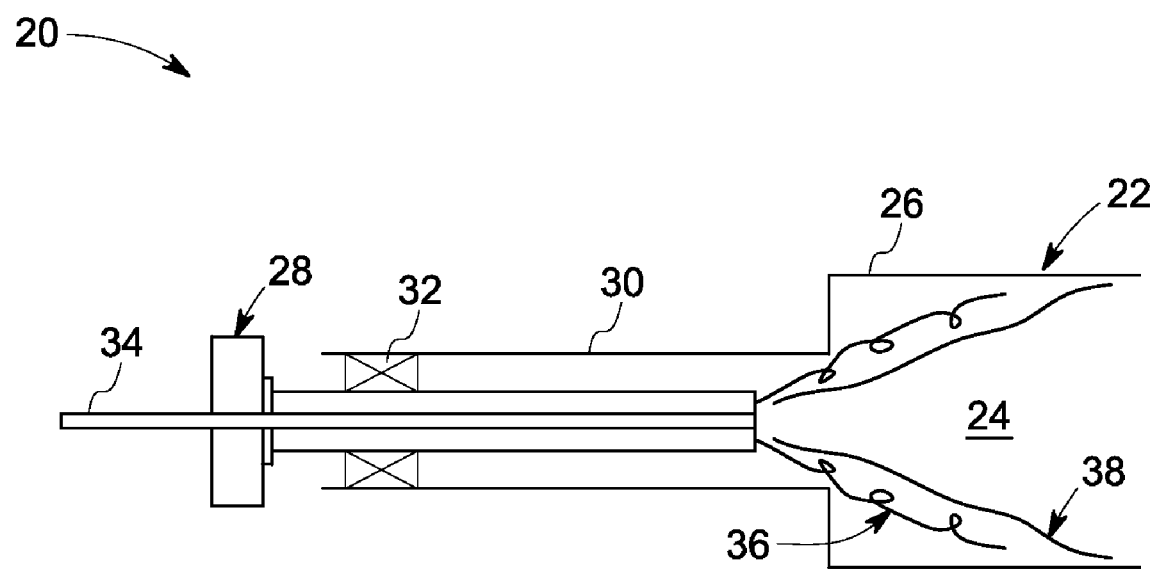
FIG. 3 illustrates a portion of the gas turbine combustor system.

FIG. 3 illustrates a portion of the gas turbine combustion system 20 in respect to a single combustor can. The combustor system 20 includes a combustor can 22 defining a combustion chamber 24 therein. The combustor can 22 is generally annular in form and includes a liner 26. Fuel is injected into the combustor can 22 through a nozzle 28. The system 20 also includes a burner tube 30, swirlers 32 having vanes, and a purge-air supply line 34. The swirlers 32 promote counter-rotation to an airflow provided to the combustor can 22. A vortex structure 36 is formed in the combustion chamber 24 in proximity to flame surface 38 during the operation of gas turbine. Vortex phenomena such as vortex shedding from flame and flame-vortex interaction may be generated during the operation of gas turbine.

Figure 4:
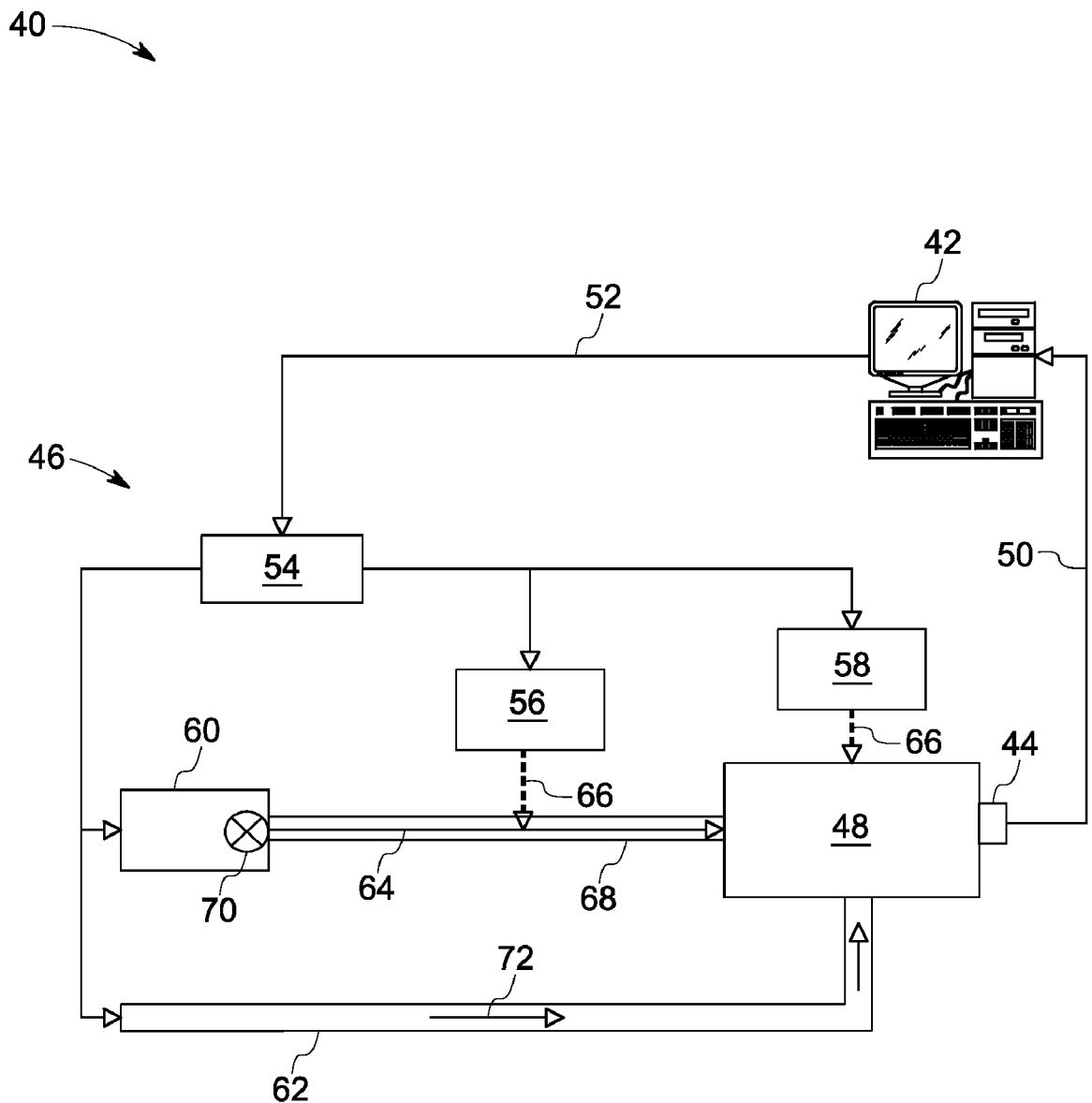
FIG. 4 illustrates a functional block diagram of a gas turbine engine control system in accordance with aspects disclosed herein.

FIG. 4 illustrates a block diagram of an embodiment of a gas turbine engine control system 40. The control system 40 includes a data acquisition and analysis system 42, a combustion dynamics sensor 44, and a combustion dynamics control system 46. Although only one combustor can 48 is shown, the control system can be adapted to any number of combustor cans. In one embodiment, each combustor can 48 is equipped with the combustion dynamics sensor 44.

The combustion dynamics sensor 44 generates signals 50 representing combustion dynamics. The sensor 44 can monitor either pressure fluctuations or flame perturbations inside the combustor can. The sensor 44 can be a pressure sensor or a flame sensor such as an optical or chemical sensor for measuring flame response. The signals 50 from the sensor 44 are provided to the data acquisition and analysis system 42.

The data acquisition and analysis system 42 receives signals 50 from the sensor 44 and processes them to provide an output signal 52 to the combustion dynamics control system 46. Several signal processing techniques can be used for processing the signals 50 received from the combustor can to generate the output signal 52 that accurately represents combustion dynamics. The output signal 52 will then be utilized by the combustion dynamics control system for controlling combustion dynamics.

Fluctuations in equivalence ratio (fuel-air ratio) and velocity (flow-rate) are the main factors responsible for causing combustion dynamics. Vortex phenomena such as vortex shedding from flame and flame-vortex interaction are also responsible for causing combustion dynamics. The combustion dynamics control system 46 reduces combustion dynamics by fluctuating or perturbing equivalence ratio, velocity, vortex phenomena, or any combination thereof. It should be noted that the terms "fluctuations", "perturbations", "oscillations" can be used interchangeably in context of this application.

In one embodiment, the combustion dynamics control system 46 comprises a controller 54, acoustic drivers 56 and 58, a flow-manipulating device 60, and a dedicated flow path 62. The acoustic driver 56, the flow-manipulating device 60, or both are used to perturb a purge-air or inert flow 64 entering the combustor can. The purge-air flow 64 can enter the combustion can 48 through diffusion passage (not shown), oil cartridge (not shown), or other nozzle passages (not shown). The acoustic driver 56 is configured to send acoustic energy or acoustic waves 66 through the purge-air flow 64. Acoustic drivers may include siren devices, speakers, or other similar equipment capable of generating acoustic waves at a desired frequency. In one embodiment, the acoustic driver 56 can be placed in the path 68 of the purge-air flow 64. The acoustic signals 66 passing through the purge-air will generate perturbations in purge-air flow.

A perturbation valve 70 can be used as the flow-manipulating device. The perturbation valve 70 is placed in the path of the purge-air flow. When activated, the perturbation valve 70 creates fluctuations in the purge-air flow 64. In one embodiment, the perturbation valve is a fluidic valve. Alternately, the perturbation valve can be a mechanical valve, an electromechanical valve, or any other valve capable of generating perturbations in the flow rate.

If the output signal 52 is indicative of combustion dynamics, the controller 54 provides commands to perturb purge airflow 64. The controller 54 activates the acoustic driver 56 or the perturbation valve 70 or both to perturb purge airflow 64. The perturbed purge-air flow 64 will in turn cause perturbations in equivalence ratio and velocity at flame-base and propagates through the flame. Equivalence ratio and velocity fluctuations modulate combustion in the combustor can 48 and interaction of combustion with acoustic field, thereby mitigating combustion dynamics.

The dedicated flow path 62 is used for delivering a flow 72 into the combustor can 48. This flow 72 can include fuel, air, or a mixture of fuel and air. The flow 72 from the dedicated flow path 62 enters the combustor can 48 and perturbs vortex phenomena. In addition, an additional acoustic driver 58 can be configured to send an acoustic wave 66 into the combustor can 48 to perturb the vortex phenomenon.

If the output signal 52 is indicative of combustion dynamics, the controller 54 provides commands to perturb vortex phenomena. The controller 54 can control the flow 72 being introduced into the combustor can and/or can activate the acoustic driver 58 to perturb vortex phenomena. Perturbations in vortex phenomena will disturb vortex phenomena such as vortex shedding from flame and flame-vortex interaction, thereby mitigating or eliminating combustion dynamics.

The controller 54 is in real time communication with the data acquisition and analysis system 42. The controller 54 can control any of the acoustic drivers 56 and 58, the flow-manipulating device 60, and the flow 72 from the dedicated flow path 62 either alone or in various combinations. For example, if an output signal 52 at a first instance is indicative of combustion dynamics, the controller 54 can activate only the acoustic driver 56 in the purge-air flow path 68 to send an acoustic wave 66. There may be a change in combustion dynamics upon activation of the acoustic driver 56. A subsequent output signal at second instance from the data acquisition and analysis system 42 will indicate whether the activation of the acoustic driver 56 reduced or eliminated combustion dynamics. If there is no change in combustion dynamics or if there is an increase in combustion dynamics, the controller 54 can tune the acoustic driver 56 to send an acoustic wave at different frequency. An output signal at third instance will indicate any effect on combustion dynamics. This process can be repeated to reduce combustion dynamics.

Similarly, the controller 54 can activate the flow-manipulating device 60 either alone or in combination with the acoustic driver 56 and check for feedback from the output signal 52 after the activation. If the feedback indicates reduction or elimination in combustion dynamics, the controller 54 can deactivate the acoustic driver 56 and flow-manipulating device 60 and normal operation is resumed.

If the control of the flow-manipulating device 60, the acoustic driver 56, or combination of both does not provide any reduction in combustion dynamics, then it can be interpreted that combustion dynamics are not caused by fluctuations of the equivalence ratio or velocity. Therefore, there is a possibility that vortex phenomena may be causing combustion dynamics. The controller 54 may then activate the additional acoustic driver 58. In addition, the controller 54 can also start the flow 72 from the dedicated flow path 62. If the feedback from the data acquisition and analysis system 42 indicates reduction or elimination in combustion dynamics, the controller 54 can deactivate the acoustic driver 58 and stop the flow 72.

As discussed previously, the controller 54 can control any of the acoustic drivers 56 and 58, the flow-manipulating device 60, and the flow 72 from the dedicated flow path 62 either alone or in various combinations and also in different order. The controller 54 and the data acquisition and analysis system 42 are in real-time communication. Therefore, the controller 54 can try different control combinations to reduce combustion dynamics in a relatively short time, much before combustion dynamics lead to unwanted effects in operation of gas turbines.

Figure 5:
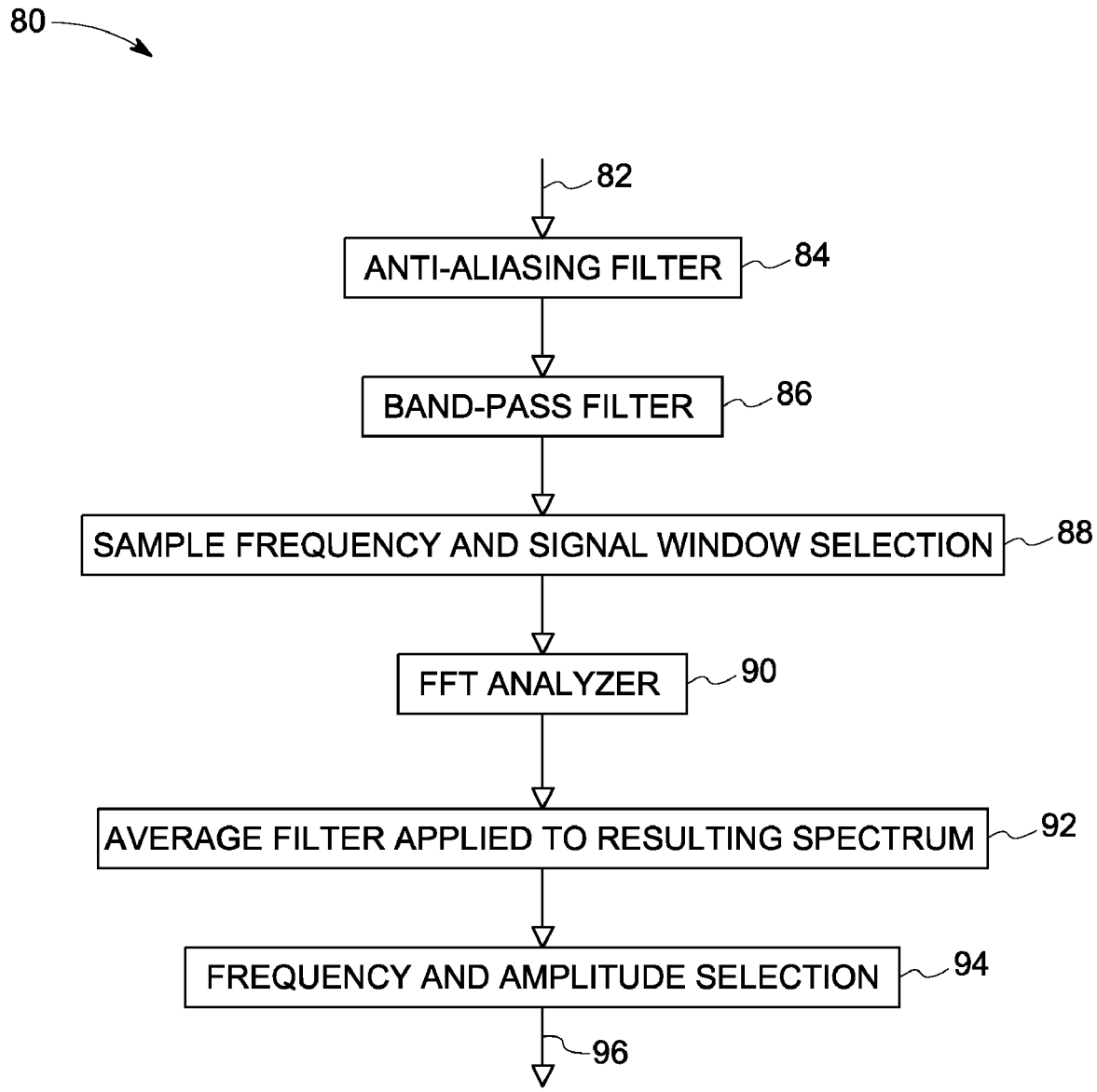
FIG. 5 illustrates a block diagram of data acquisition and analysis system in accordance with aspects disclosed herein.

FIG. 5 illustrates a block diagram of an embodiment of a signal processing technique 80 used by the data acquisition and analysis system. In one embodiment, signals 82 from combustion dynamics sensor are passed through an anti-aliasing filter 84 to ensure minimum distortion from high frequency components. The signal is then processed through a band-pass filter 86 in order to curtail frequency content of the signal to yield data within a frequency band of interest. A determination of sampling frequency is then made at block 88 according to Nyquist criterion that states that a sampling frequency must be at least twice the maximum frequency of interest. Similarly, a sampling window is selected in line with required frequency resolution and energy leakage. The signal is then supplied to a Fast Fourier Transform (FFT) analyzer 90 that converts a time-domain signal to a frequency-domain signal. The frequency spectra are averaged at block 92 over multiple instances (for example 64 instances) in order to obtain a more representative signal content that is not influenced by transients in the system. The averaged spectra are then evaluated and the peak frequency and its amplitude in various bands are determined at block 94. This peak frequency and amplitude data forms the output signal 96 that is provided to the controller.

Figure 6:
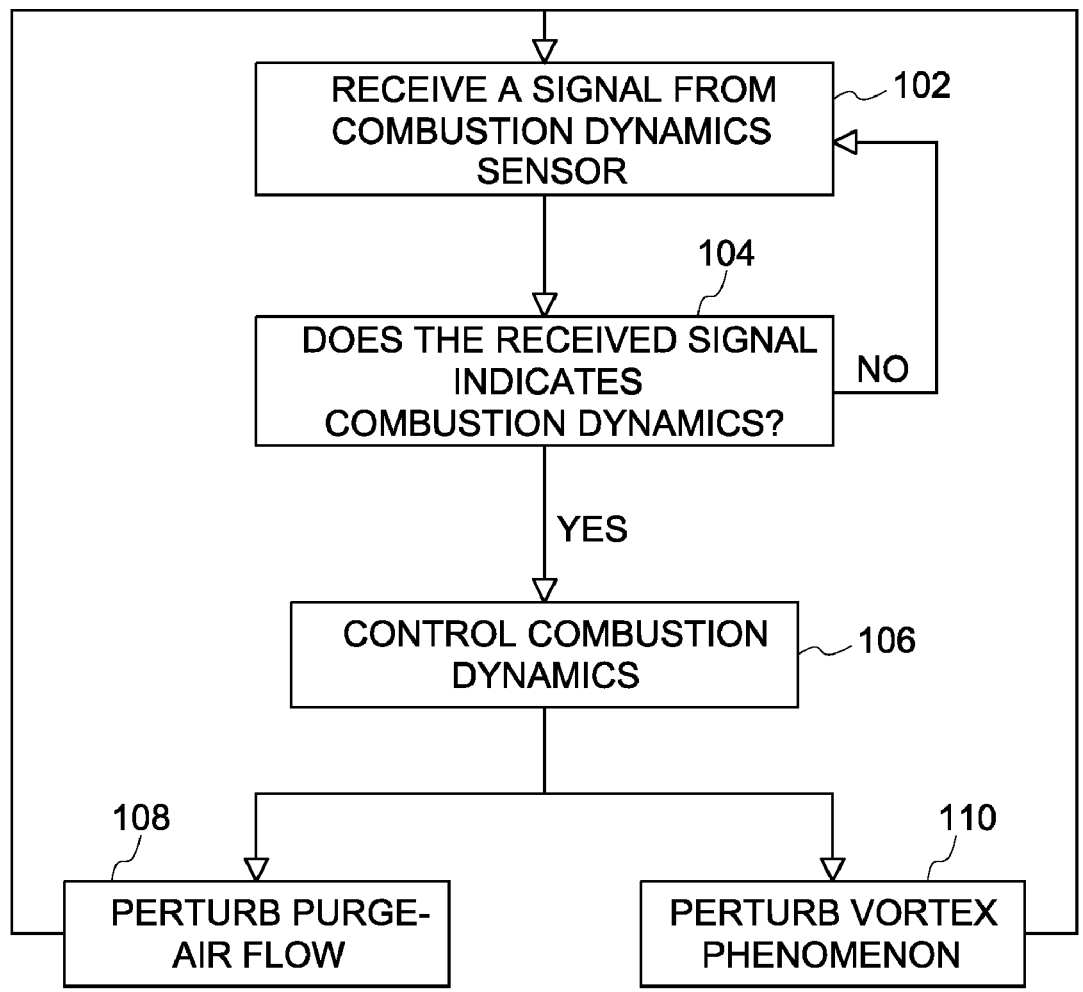
FIG. 6 illustrates a block diagram of a gas turbine control method in accordance with aspects disclosed herein.

FIG. 6 illustrates a block diagram of a gas turbine control method 100. At block 102, a signal is received from a combustion dynamics sensor. The determination of whether the received signal is indicative of combustion dynamics is made at block 104. If the signal is not indicative of combustion dynamics, then the method proceeds to block 102. If the signal is indicative of combustion dynamics, then the method proceeds to block 106 for controlling combustion dynamics. Combustion dynamics can be controlled either by perturbing purge-air flow entering a combustor can at block 108 or by perturbing vortex phenomena a combustor can at block 110. Both purge-air flow and vortex phenomena can be perturbed to control combustion dynamics.

Purge-air flow is perturbed by using acoustic signals, flow-manipulation, or both. Vortex phenomenon in the combustor can is perturbed by acoustic signals, a dedicated flow into a combustor can, or both. After blocks 108 and 110, the method starts from the beginning and the process is repeated until combustion dynamics are either eliminated or mitigated to an accepted or tolerable level.

The gas turbine engine control system and method described above thus provide a way to control combustion dynamics by perturbing purge-air flow and perturbing vortex phenomena to control combustion dynamics. The control system and method mitigate or eliminate combustion dynamics to prevent any damage to gas turbines. The control system and method can be integrated with existing gas turbine control systems.

It is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A gas turbine engine control system, comprising:
a data acquisition and analysis system for receiving a signal from a combustion dynamics sensor and providing an output signal; and
a combustion dynamics control system for controlling combustion dynamics based on the output signal, the control system is associated with a purge-air flow and comprises an acoustic driver, or a flow-manipulating device, or both to perturb the purge-air flow entering a combustor can for controlling combustion dynamics.

2. The system of claim 1, wherein the control system controls combustion dynamics if the output signal is indicative of combustion dynamics.

3. The system of claim 1, wherein the flow-manipulating device comprises a perturbation valve in a path of the purge-air flow to perturb the purge-air flow.

4. The system of claim 1, wherein the acoustic driver is configured to send an acoustic wave in a path of the purge-air flow to perturb the purge-air flow.

5. The system of claim 1, wherein the purge-air flow is perturbed to cause fluctuations in equivalence ratio and flow rate for mitigating combustion dynamics.

6. The system of claim 1, wherein the control system further comprises a dedicated flow path for delivering a flow into the combustor can and an additional acoustic driver.

7. The system of claim 6, wherein the control system further comprises a controller to control the acoustic drivers, the flow-manipulating device, and the flow delivered through the dedicated flow path.

8. The system of claim 6, wherein a vortex phenomenon in the combustor can is perturbed by the additional acoustic driver, the flow delivered through the dedicated flow path, or a combination of both for controlling combustion dynamics.

9. The system of claim 8, wherein the additional acoustic driver is configured to send an acoustic wave into the combustor can to perturb the vortex phenomenon.

10. The system of claim 8, wherein the flow delivered through the dedicated flow path comprises fuel, air, or a mixture of fuel and air.

11. The system of claim 8, wherein the vortex phenomenon is perturbed to mitigate combustion dynamics.

12. The system of claim 8, wherein the vortex phenomenon comprises vortex shedding, flame-vortex interaction, or a combination thereof.

13. The system of claim 1, wherein the combustion dynamics sensor is associated with the combustor can.

14. The system of claim 13, wherein the combustion dynamics sensor comprises a dynamic pressure sensor or a flame sensor.

15. A gas turbine engine control method, comprising:
receiving a signal from a combustion dynamics sensor; and
controlling combustion dynamics based on the received signal by perturbing a purge-air flow entering a combustor can using acoustic signals, flow-manipulation, or a combination thereof.

16. The method of claim 15, wherein controlling comprises controlling combustion dynamics if the received signal is indicative of combustion dynamics.

17. The method of claim 16, wherein using flow-manipulation comprises inducing perturbation in a path of the purge-air flow to perturb the purge-air flow.

18. The method of claim 16, wherein controlling combustion dynamics by perturbing the purge-air flow entering the combustor can comprises mitigating combustion dynamics.

19. The method of claim 15, wherein controlling combustion dynamics further comprises controlling combustion dynamics based on the received signal by perturbing a vortex phenomenon in the combustor can using the acoustic signals, a dedicated flow into a combustor can, or a combination thereof.

20. The method of claim 19, wherein the dedicated flow comprises fuel, air, or a mixture of fuel and air.

21. The method of claim 19, wherein controlling combustion dynamics by perturbing the vortex phenomenon comprises mitigating combustion dynamics.

22. The method of claim 19, wherein the vortex phenomenon comprises vortex shedding, flame-vortex interaction, or a combination thereof.

23. The method of claim 15, wherein the combustion dynamics sensor is associated with a combustor can.

24. The method of claim 15, wherein the combustion dynamics sensor comprises a dynamic pressure sensor or a flame sensor.

25. A system for a gas turbine engine, comprising:
a data acquisition and analysis system for receiving a signal from a combustion dynamics sensor and providing an output signal; and
a combustion dynamics control system for controlling combustion dynamics based on the output signal, the control system comprising a controller and at least one of an acoustic driver, a flow-manipulating device, and a dedicated flow path for delivering a flow into a combustor can to perturb a purge-air flow entering the combustor can, perturb a vortex phenomenon in the combustor can, or both for controlling combustion dynamics.

26. A gas turbine engine control method, comprising:
receiving a signal from a combustion dynamics sensor; and
controlling combustion dynamics based on the received signal by perturbing a purge-air flow entering a combustor can, a vortex phenomenon in the combustor can, or both using acoustic signals, flow-manipulation, a dedicated flow into a combustor can, or a combination thereof.

* * * * *